Patented Oct. 2, 1934

1,975,179

UNITED STATES PATENT OFFICE 1,975,179

COATING MATERIAL

Omar H. Smith, West Englewood, N. J., assignor to The Naugatuck Chemical Company, Naugatuck, Conn., a corporation of Connecticut No Drawing. Application August 1, 1930, Serial No. 472,494

4 Claims. (Cl. 134—26)

This invention relates to the manufacture of improved styrol varnishes.

An object of this invention is to provide an improved styrol varnish which when laid down on a surface will give a clear film having superior flexibility and one which is substantially free from checking upon ageing. Another object is to produce a styrol varnish which is highly resistant to the influence of light and air, which is waterproof and which is substantially unaffected by moderately strong acids and bases. A further object is to provide a styrol varnish having the mentioned properties and which will tightly adhere to surfaces such as wood, metal, paper and similar materials. Previous varnishes using styrol have exhibited poor adhesion to surfaces and poor ageing properties.

Illustrative of the invention is the following which is not to be construed as limiting thereof. Percentages and parts are by weight:

Example 1.—A mixture of approximately 80 parts of normally tough meta styrol and approximately 20 parts of softener are dissolved in a volatile solvent, the amount of which varies with the desired consistency of the whole solution. Examples of softeners are: dibutyl phthalate, diethyl phthalate, phenyl phthalate, ethyl abietate, triphenyl phosphate, camphor and phenylated camphor, or mixtures thereof. Where opaque varnishes are desired, fatty acids may be used. If fatty acids are used in small amounts they may be used with the previously mentioned softeners, particularly the more soluble ones such as triphenyl phosphate, without causing undue opacity. Suitable solvents include benzol, ethyl benzol, toluol, xylol, carbon tetrachloride, ethyl acetate, amyl acetate or mixtures of these. The drying time varies with the solvent or solvents used. If desired, pigments may be added with the varnish to form a paint. Examples showing the high protective value of the varnish are given below:

Example 2.—The varnish used consists of a mixture of approximately 80% meta styrol and 20% dibutyl phthalate dissolved in a mixture of ethyl benzol and toluol. When applied to a metal container and exposed to the weather on a roof for 3½ months the varnish film did not deteriorate to any noticeable degree. On the other hand meta styrol varnish containing no softener checked badly in the course of a few days under similar conditions.

In cases where a high degree of resistance to deterioration is desired, such as where varnish films are exposed for some time to the sun, an anti-oxidant such as is used to retard the deterioration of rubber may be incorporated with the varnish. Among such anti-oxidants may be mentioned the material resulting from fluxing beta naphthol and polyethylene polyamine, the latter being a reaction product of ethylene dichloride and ammonia,—the reaction product of acetone and diphenyl amine,—the reaction product of acetaldehyde and aniline in acid medium,—dinaphthyl diamido diphenyl methane, diphenyl ethylene diamine.

Example 3.—A varnish consisting of a solution of 40% meta styrol, 10% dibutyl phthalate, 0.5% of the first mentioned anti-oxidant above, in which the proportion of beta naphthol to polyethylene polyamine used is about 6 to 1 by weight, and 49.5% of ethyl benzol is diluted to spreading consistency with xylol and applied to the woodwork of a motor-boat just above the water line where it is exposed to salt-water spray and sunshine. The film is cleaned frequently with alkaline cleaning agents which have a pronounced deteriorating action on ordinary varnishes. Styrol varnish maintains an excellent appearance for over four months.

Example 4.—A varnish is prepared having a non-volatile content of approximately 22%. The solvent used is a mixture of equal parts of xylol and toluol. The non-volatile portion consists of 1.6 parts of the same anti-oxidant as stated in Example 3, 77.8 parts of normally tough meta styrol, 10.3 parts camphor, and 10.3 parts of dibutyl phthalate. This varnish is applied to a wooden panel and exposed to the weather. A similar sample but omitting the anti-oxidant is also exposed at the same time. The varnish containing the anti-oxidant withstood the weather decidedly better than the varnish lacking anti-oxidant.

In the cast of automobile lacquers the difficulty has been that styrol solutions generally without plasticizers have given hard non-flexible films that do not adjust themselves to volume changes due to changes in temperature. For such work where deflection under load is desirable, in addition to the plasticizers or softeners previously mentioned, additional plasticizers that may be used are di-styrol, castor oil, stearic acid, thymol, tripentene, triacetin, tricresyl phosphate, palmitic acid, oleic acid, turpentine, phenyl ether. In using the fatty acids, consideration should be given as previously mentioned to their property of producing opaqueness. The proportion of softeners used may vary, for instance, equal parts of ethyl abietate and meta styrol produce a pliable transparent film, but generally, preferably not substantially in excess of 25% of softener is used in order to avoid too soft a film. Generally 10% of plasticizer or softener gives good results.

In order to increase the tightness of adhesion of the varnish to surfaces, especially to metal surfaces, a suitable amount of cumar resin may be incorporated with the styrol with or without the addition of the previously mentioned softeners. The use of cumar resin decreases the viscosity of the varnish per unit of non-volatile content, and therefore allows of producing a varnish which will spray more readily.

An example showing the use of cumar resin is hereby given:

Example 5.—10 parts of normally tough meta styrol, 7 parts of cumar resin, 5 parts of dibutyl phthalate, 38 parts xylol, and 38 parts toluol. Both the proportion and the nature of the solvent can be changed without altering the physical properties of the varnish film. The proportion of cumar resin used may vary, suitable varnishes being obtained with as high as 40% cumar resin. In place of cumar resin, in order to produce a varnish having superior adhesion and spraying properties, there may be used a brittle meta styrol such as designated by Ostromislensky in his U. S. Patent 1,683,402 as beta meta styrol, or any other brittle resin which is compatible with normally tough meta styrol.

Where a highly flexible and elastic varnish film having a hard non-tacky surface and of superior resistance to heating is desired, a non-volatile oily material which is compatible with the meta styrol, that is, one which will easily blend therewith and which will not segregate itself from the styrol in the varnish film, is used in addition to the usual quantity of dibutyl phthalate as plasticizer. An example of a varnish containing such an improved plasticizing mixture is hereby given:

Example 6.—A mixture consisting of 78 parts solvent and 22 parts non-volatile material, the non-volatile material consisting of 71 parts meta styrol, 9.2 parts heptene base and 19.8 parts dibutyl phthalate. Heptene base may be made by condensing heptaldehyde and aniline in neutral or slightly acid solution. Films laid down from this varnish remain flexible after three hours heating at 70° C., and are apparently unchanged after 5 months at room temperature.

The styrols mentioned herein are described in U. S. Patent 1,683,402, issued Sept. 4, 1928 to Ostromislensky and where the expression "normally tough meta styrol" or "meta styrol" occurs in the claims, it is intended to cover the alpha meta styrols or styrols having similar physical properties.

Having thus described my invention, what I claim and desire to protect by Letters Patent is:

1. As a new article of manufacture a styrol varnish comprising a major portion of a meta styrol and a minor portion of a softener therefor, cumar resin, and a volatile solvent.

2. As a new article of manufacture a styrol varnish comprising a major portion of a normally tough meta styrol and a minor portion of a softener therefor, a minor portion of cumar resin, and a volatile solvent.

3. As a new article of manufacture a styrol varnish comprising a major portion of a meta styrol and a minor portion of dibutyl phthalate, a minor portion of cumar resin, and a volatile solvent.

4. As a new article of manufacture a styrol varnish comprising a normally tough meta styrol; dibutyl phthalate; a non-volatile oily material compatible with the meta styrol selected from the group consisting of heptene base, undecylenic acid and dibenzylamine; and a volatile solvent.

OMAR H. SMITH.